United States Patent Office 2,751,370
Patented June 19, 1956

2,751,370

RUBBERS STABILIZED WITH A 1-ARYL-2-MERCAPTO-2-IMIDAZOLINE

Philip A. Roussel, Wilmington, Del., assignor to E. I. du Pont de Nemours and Company, Wilmington, Del., a corporation of Delaware No Drawing. Application January 25, 1954,
Serial No. 406,092

8 Claims. (Cl. 260—45.8)

This invention relates to the compounding of both natural and synthetic rubbers, and more particularly to a method of preventing or retarding the formation of cracks in the surfaces of vulcanized rubbers on exposure to light and atmosphere by the addition of certain stabilizing agents.

When rubber surfaces are exposed to air, a gradual change and reduction of quality takes place throughout the rubber, involving hardening and decrease in extensibility, quantitatively shown by increase in modulus of elasticity and decrease in tensile strength and elongation at break. This change may be controlled by a variety of antioxidants, well known in the art, but more effective agents are desirable. Another form of deterioration, however, is not believed to be caused by oxygen and takes place when exposed rubber surfaces are either statically or dynamically stressed, forming surface cracks. This form of failure is sometimes called sun-cracking or ozone cracking, and is believed to be due to small amounts of ozone in the air. The number and depth of the cracks depend on the severity of the exposure and the amount of stress applied. Obviously, as the cracking becomes more severe the quality of the rubber, as measured for example by tensile strength, falls sharply and the rubber finally fails.

The conventional rubber antioxidants are in general rather ineffective in controlling cracking of this type, which indicates that atmospheric oxidation is not alone involved in the surface cracking of rubbers. Radically different anti-cracking agents have been sought and are used to some extent. Thus when the rubber is not to be considerably flexed, it has been found satisfactory to incorporate certain waxes which "bloom" upon the surface, forming a protective layer. This protection is of no value when the rubber is repeatedly flexed. Certain agents have been found that greatly reduce the cracking of flexed natural or synthetic rubbers exposed to sunlight but at the same time they accelerate normal oxidation, again showing that oxidation and cracking have somewhat different causes.

In rubber compounding, in addition to the agents added as antioxidants it is of course necessary to add one or more compounds to accelerate the vulcanization. These accelerators and the antioxidants usually belong to entirely different class of organic compounds. It is obvious that it would simplify compounding and reduce costs if an agent could be found which would have the double function of accelerating vulcanization and retarding the effects of sunlight, etc., upon the vulcanized rubbers.

It is therefore an object of this invention to provide a process for preventing or retarding the formation of cracks in the surface of vulcanized rubbers on exposure to light and atmosphere by a class of stabilizing agents which also function as accelerators for the vulcanization of such rubbers. It is a more specific object of the invention to provide a method of compounding both natural and synthetic rubbers by incorporating therein relatively small amounts of a 1-aryl-2-mercapto-2-imidazoline.

I have found that 1,3-diene elastomers, including both natural and synthetic rubbers, may be made more resistant to cracking on exposure to sunlight and ozone and also more resistant to the effects of atmospheric oxygen, by incorporating therein before vulcanization from 0.5% to 10% of a 1-aryl-2-mercapto-2-imidazoline (which may also be referred to as an N-aryl ethylene thiourea) in which the aryl group is of the benzene series. The percentages used are by weight, based on the elastomer. I have further found that this class of compounds not only acts as an anti-cracking agent but also operates as an accelerator of vulcanization.

The elastomers to which the present invention particularly relates are natural rubber (crepe, smoked sheets, etc.) or any synthetic rubber containing at least 50% of a polymerized 1,3-diene such as polymers of chloroprene, butadiene or isoprene, or copolymers of these with other copolymerizable compounds.

The 1-aryl-2-mercapto-2-imidazoline (which may otherwise be referred to as N-aryl ethylene thiourea) may exist in tautomeric forms having the formula:

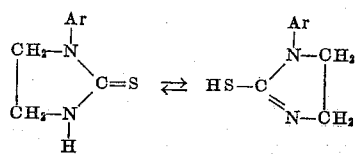

in which Ar is an aryl group of the benzene series, either unsubstituted or containing non-acidic substituents such as a low molecular weight alkyl, halogen, hydroxyl, nitro or the like. Where the expression 1-aryl-2-mercapto-2-imidazoline is employed, it refers broadly to the compound of the above formula irrespective of the particular tautomeric form in which it actually may be found to exist. These compounds may be prepared by reacting the corresponding N-aryl ethylene diamine with carbon disulfide at reflux, preferably in alcoholic solution. The N-phenylethylene thiourea has been described by Newman in Berichte 24, page 2191.

The 1-aryl-2-mercapto-2-imidazolines may in general be used with any of the usual rubber compounding ingredients, that is, plasticizers, pigments, fillers, extenders, reinforcing agents, antioxidants and, when necessary, accelerators. It has been unexpectedly found that, when used together with the common diaryl amine antioxidants such as phenyl beta-naphthylamine, a very pronounced synergistic effect upon the prevention of cracking is obtained.

The following examples are given to illustrate this invention. The parts used are by weight unless otherwise specified, and the percentages employed are based on the weight of the elastomers with which the stabilizing agents or other antioxidants are employed. In these examples the stabilizing agents were tested for their effect upon cracking by incorporation into elastomers and subjecting the vulcanized elastomer to both accelerated and natural aging tests. The anti-ozone properties of the vulcanized elastomer containing the subject stabilizing agents were evaluated in two tests, (1) an accelerated test consisting of exposure to the elastomer under 20% stress to air containing one part per million of artificially generated ozone, and (2) a practical test consisting of exposure of stressed samples (1 x 4 inch samples bent double) out-of-doors to the atmosphere and sunlight. The elastomers were then examined periodically for the appearance of cracks.

EXAMPLE 1

For evaluation in natural rubber, the following stock was used in the examples, unless otherwise specified:

| | Parts |
|---|---|
| Smoked sheets | 100 |
| Zinc oxide | 5 |
| Carbon black | 45 |
| Stearic acid | 2 |
| Zn salt of 2-mercaptobenzothiazole+10% diortho-tolyl guanidine | 1.2 |
| Sulfur | 3 |
| Stabilizing agent as indicated. | |

The cure was for 30 minutes at 287° F.

Table I gives results for three 1-aryl-2-mercapto-2-imidazolines coming within the scope of this invention.

Table I

| Stabilizing Agent | Days in Accelerated Ozone Test to— | | |
|---|---|---|---|
| | First Slight Cracks | Medium Cracks | Bad Cracks |
| None | 1 | 3 | 8 |
| 3% 1-Phenyl-2-mercapto-2-imidazoline | 15 | 60 | 75 |
| 3% 1-p-Tolyl-2-mercapto-2-imidazoline | 9 | 40 | 50 |
| 3% 1-p-Chlorophenyl-2-mercapto-2-imidazoline | 18 | 50 | 72 |

EXAMPLE 2

Table II gives results of outdoor exposure (May through September near Wilmington, Delaware) of test pieces containing different amounts of 1-phenyl-2-mercapto-2-imidazoline.

Table II

| Anti-Cracking Agent | Days Outdoor Exposure to— | |
|---|---|---|
| | First Slight Cracks | Medium Cracks |
| None | 1 | 21 |
| 1.5% 1-Phenyl-2-mercapto-2-imidazoline | 17 | 80 |
| 3.0% 1-Phenyl-2-mercapto-2-imidazoline | 45 | 92 |

The above table shows that the 1-phenyl-2-mercapto-2-imidazoline of the present invention is a very effective anti-cracking agent for rubber exposed to sunlight (as well as to ozone as shown in Table I), and that the ozone test, in addition to being an actual measure of resistance to ozone, is also a good accelerated test for predicting the results of exposure to sunlight, which produces its effects slowly.

EXAMPLE 3

Table III shows the effect of outdoor exposure of samples containing 1-phenyl-2-mercapto-2-imidazoline and phenylbeta-naphthylamine (a well-known and effective antioxidant), alone and together.

Table III

| Agent | Days Outdoor Exposure to— | |
|---|---|---|
| | First Slight Cracks | Medium Cracks |
| (1) None | 1 | 21 |
| (2) 3.0% 1-Phenyl-2-mercapto-2-imidazoline | 45 | 92 |
| (3) 3.0% Phenyl beta-naphthylamine | 21 | 105 |
| (4) 1.5% of each of (2) and (3) | 105 | 140 |

The above table shows that the compound of this invention is much superior to an excellent antioxidant as an anti-cracking agent and that the two together show a remarkable synergistic effect, that is, the two together show a much greater effect than either separately, even when present in an amount equal to the combined weight of the two. When the 1-aryl-2-mercapto-2-imidazolines are used in conjunction with the common diarylamine antioxidants, from 0.25% to 5% of each of these compounds, based on the weight of the elastomer, has been found to give satisfactory results.

EXAMPLE 4

The subject compounds also retard cracking and deterioration in synthetic rubbers such as polymers of chloroprene (neoprene) and copolymers of butadiene and styrene (GR-S). The following stocks were used:

| | Parts |
|---|---|
| GR-S | 100 |
| Zylyl mercaptan | 0.5 |
| Stearic acid | 1.0 |
| Carbon black | 45 |
| Zinc oxide | 5 |
| Processing oil | 10 |
| Mercaptobenzothiazole | 0.2 |
| Tetramethyl thiuram monosulfide | 0.2 |
| Sulfur | 1.75 |
| Stabilizing agent as indicated. | |

The cure was for 40 minutes at 287° F.

| | Parts |
|---|---|
| Polychloroprene (Neoprene GN) | 100 |
| Magnesia | 4 |
| Stearic acid | 0.5 |
| Carbon black | 29 |
| Zinc oxide | 5 |
| Stabilizing agent as indicated. | |

The cure was for 20 minutes at 307° F.

Table IV. (GR-S)

| Stabilizing Agent | Hours in Accelerated Ozone Test to— | | |
|---|---|---|---|
| | First Slight Cracks | Medium Cracks | Bad Cracks |
| None | 1 | 6 | 12 |
| 3% 1-Phenyl-2-mercapto-2-imidazoline | 12 | 60 | 120 |

In polychloroprene, 3% of 1-phenyl-2-mercapto-2-imidazoline prevented the formation of any cracks in the ozone test for at least 100 days. Without it, the neoprene showed the first slight cracks after one day, and bad cracks after 12 days.

EXAMPLE 5

In addition to their anti-cracking and anti-ozone effects, the thioureas of the present invention are good accelerators for the vulcanization of rubber. Thus, when the regular accelerators (Zn salt of 2-mercaptothiazole and diorthotolyl guanidine) were omitted from the test formula for natural rubber given above and varying amounts of 1-phenyl-2-mercapto-2-imidazoline were used as the only accelerator, with sulfur, the cures characterized in Table V were obtained. The curing conditions again were 30 minutes at 287° F.

Table V

| Accelerator | Conc., percent | $M_{100}$ | $M_{300}$ | $T_B$ | $E_B$ | Hardness |
|---|---|---|---|---|---|---|
| 1-Phenyl-2-mercapto-2-imidazoline | 0.0 | (1) | (1) | (1) | (1) | (1) |
| Do | 0.5 | 100 | 450 | 1,500 | 570 | 43 |
| Do | 0.75 | 100 | 525 | 1,625 | 530 | 45 |
| Do | 1.0 | 150 | 925 | 2,675 | 570 | 50 |
| Do | 1.5 | 275 | 1,350 | 4,100 | 620 | 60 |
| Do | 3.0 | 425 | 1,925 | 4,000 | 530 | 70 |

[1] Soft and sticky; little strength.

Thus, a concentration of 1.5% of 1-phenyl-2-mercapto-2-imidazoline gives a rubber product of excellent physical properties.

The compounding of the stocks used in the above examples is effected in the usual manner, and the materials of the present invention were incorporated by addition to the stock as it was worked on the rubber mill. As illustrated in the above examples, it is the vulcanized stock that exhibits the improved stabilized effect against aging.

I claim:

1. A 1,3-diene elastomer stabilized against deterioration in the vulcanized state by having incorporated therein prior to vulcanization from 0.5% to 10% of a 1-aryl-2-mercapto-2-imidazoline in which the aryl group is of the benzene series.

2. Rubber stabilized against deterioration in the vulcanized state by having incorporated therein prior to vulcanization from 0.5% to 10% of a 1-aryl-2-mercapto-2-imidazoline in which the aryl group is of the benzene series.

3. A 1,3-butadiene elastomer stabilized against deterioration in the vulcanized state by having incorporated therein prior to vulcanization from 0.5% to 10% of a 1-aryl-2-mercapto-2-imidazoline in which the aryl group is of the benzene series.

4. A polychloroprene elastomer stabilized against deterioration in the vulcanized state by having incorporated therein prior to vulcanization from 0.5% to 10% of a 1-aryl-2-mercapto-2-imidazoline in which the aryl group is of the benzene series.

5. A process of vulcanizing rubber, which comprises incorporating therein prior to the heating step from 0.5% to 10% of a 1-aryl-2-mercapto-2-imidazoline in which the aryl group is of the benzene series.

6. A 1,3-diene elastomer stabilized against deterioration in the vulcanized state by having incorporated therein prior to vulcanization from 0.5% to 10% of a 1-phenyl-2-mercapto-2-imidazoline.

7. Rubber stabilized against deterioration in the vulcanized state by having incorporated therein prior to vulcanization from 0.5% to 10% of 1-p-tolyl-2-mercapto-2-imidazoline.

8. A 1,3-diene elastomer stabilized against deterioration in the vulcanized state by having incorporated therein prior to vulcanization from 0.5% to 10% of 1-p-chlorophenyl-2-mercapto-2-imidazoline.

References Cited in the file of this patent

UNITED STATES PATENTS 2,544,746     Baum  ---------------- Mar. 13, 1951